United States Patent
Ito et al.

(10) Patent No.: US 12,227,137 B2
(45) Date of Patent: Feb. 18, 2025

(54) IMPACT ANALYSIS METHOD, FEATURE AMOUNT EXTRACTION METHOD, IMPACT ANALYSIS APPARATUS, AND PROGRAM

(71) Applicant: NIPPON TELEGRAPH AND TELEPHONE CORPORATION, Tokyo (JP)

(72) Inventors: Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 65 days.

(21) Appl. No.: 18/022,066

(22) PCT Filed: Aug. 20, 2020

(86) PCT No.: PCT/JP2020/031463
§ 371 (c)(1),
(2) Date: Feb. 17, 2023

(87) PCT Pub. No.: WO2022/038744
PCT Pub. Date: Feb. 24, 2022

(65) Prior Publication Data
US 2023/0322174 A1    Oct. 12, 2023

(51) Int. Cl.
*B60R 21/0136* (2006.01)
*B60W 40/12* (2012.01)

(52) U.S. Cl.
CPC ......... *B60R 21/0136* (2013.01); *B60W 40/12* (2013.01); *B60W 2420/54* (2013.01); *B60W 2422/00* (2013.01)

(58) Field of Classification Search
CPC .............. B60R 21/0136; B60W 40/12; B60W 2420/54; B60W 2422/00
See application file for complete search history.

(56) References Cited

U.S. PATENT DOCUMENTS 10,520,947 B2 * 12/2019 Liu ...................... G05D 1/0221
10,875,483 B2 * 12/2020 De Silva ........... B60R 21/01338
(Continued)

FOREIGN PATENT DOCUMENTS

JP    2014133478 A    7/2014

OTHER PUBLICATIONS

Yupiteru Corporation (2020) "Q-20, all-around 360° drive recorder" Jupiter Internet site [online] Accessed on Jul. 8, 2020, website: https://www.yupiteru.co.jp/products/drive_recorder/q-20/.

*Primary Examiner* — Toan C To

(57) ABSTRACT

Information regarding an impact occurring in a vehicle is analyzed from an observed signal by a sensor installed in the vehicle. An acquisition unit (11) acquires an observed signal by a sensor (S) installed at a predetermined position of the vehicle. The analysis unit (12) analyzes the type of impact at each time from the observed signal with respect to the impact occurring on the vehicle at a position different from the position at which the sensor (S) is installed in the vehicle. The type of impact includes at least one type of impact among impact from collision of an obstacle with the vehicle, impact from the vehicle driving over a curb, impact from collision of a flying object with the vehicle, impact from the vehicle rubbing against an object other than the vehicle, and impact from an object other than the vehicle rubbing against the vehicle. An output unit (13) outputs a result obtained by analyzing a time at which the impact occurs and the type of impact.

17 Claims, 16 Drawing Sheets

(56) References Cited

U.S. PATENT DOCUMENTS

| | | | | |
|---|---|---|---|---|
| 11,495,125 | B2* | 11/2022 | Zhang | G08G 1/0125 |
| 2014/0071283 | A1* | 3/2014 | Yousafi | G07C 5/008 |
| | | | | 348/148 |
| 2014/0195070 | A1 | 7/2014 | Shimizu et al. | |
| 2016/0144817 | A1* | 5/2016 | Chambers | B60R 21/0136 |
| | | | | 340/436 |
| 2017/0050599 | A1 | 2/2017 | Gilbert et al. | |
| 2018/0126937 | A1 | 5/2018 | De Silva et al. | |
| 2024/0029484 | A1* | 1/2024 | Benjamin | G07C 5/0808 |

\* cited by examiner

Fig. 10

| TYPE OF IMPACT | | IMAGE | SIGNAL PATTERN | FEATURE OF SIGNAL PATTERN |
|---|---|---|---|---|
| COLLISION SYSTEM | COLLIDING WITH OBSTACLE | 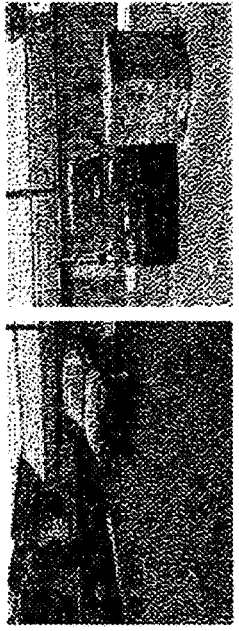 | EXPONENTIAL DECAY + PERIODIC OSCILLATION | • ATTENUATION RATE IS SLOW<br>• IMPACT IS ONCE |
| | DRIVING ON STEP | 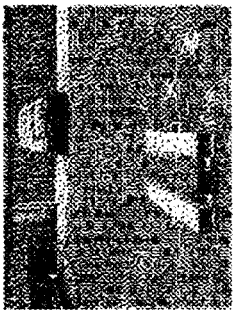 | EXPONENTIAL DECAY + PERIODIC OSCILLATION | • ATTENUATION RATE IS SLOW<br>• IMPACT OCCURS TWICE IN THE FRONT AND REAR WHEELS |
| | HITTING BALL |  | EXPONENTIAL DECAY + PERIODIC OSCILLATION | • ATTENUATION RATE IS HIGH<br>• SAME IMPACT IS REPEATED |

Fig. 11

| TYPE OF IMPACT | | IMAGE | SIGNAL PATTERN | FEATURE OF SIGNAL PATTERN |
|---|---|---|---|---|
| FRICTION SYSTEM | SCRAPING OBSTACLE | | EXPONENTIAL INCREASE + PERIODIC OSCILLATION OR STEADY OSCILLATION | • THERE IS A SPECIFIC RESONANT FREQUENCY COMPONENT |
| | SCRATCH IS MADE | | EXPONENTIAL INCREASE + PERIODIC OSCILLATION OR STEADY OSCILLATION | • MAIN FREQUENCY CHANGES OVER TIME |

IMPACT ANALYSIS METHOD, FEATURE AMOUNT EXTRACTION METHOD, IMPACT ANALYSIS APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/031463, filed on 20 Aug. 2020, the disclosure of which is hereby incorporated herein by reference in its entirety.

TECHNICAL FIELD

The present invention relates to a technology for analyzing information regarding impact from an observed signal.

BACKGROUND ART

When an automobile collides with or rubs against an object other than an automobile, scratching or deformation of a part (hereinafter generally referred to as "damage") may occur. For example, use forms such as rental cars or car sharing in which a plurality of users can drive one automobile have become widespread. In these use forms, when it is found that damage to an automobile has occurred, it is necessary to specify a time at which the damage to the automobile occurred in order to identify a user who caused the damage. For example, by providing a drive recorder (for example, see Non Patent Document 1) capable of imaging a wide range, a time at which damage occurs can be identified in some cases.

CITATION LIST

Non Patent Literature

[NPL 1] Yupiteru Company. "Q-20|entire circumference 360° drive recorder," [online], [retrieved on Jul. 30, 2020], the Internet
<URL: https://www.yupiteru.co.jp/products/drive_recorder/q-20/>

SUMMARY OF INVENTION

Technical Problem

However, even when a drive recorder is provided, it is difficult to identify a time when a scratch occurs in a case in which the scratch occurs in an area which cannot be imaged by the drive recorder. A video of the drive recorder is recorded in a situation in which various oscillations are generated due to a suspension or the like provided in an automobile or a state of a road on which the automobile is traveling. Therefore, even when damage occurs in an area which can be imaged by the drive recorder, it is difficult to automatically identify a time at which the damage occurred and it is necessary for a person to visually confirm an recorded video.

In view of the foregoing a technical problem, an objective of the present invention is to analyze information regarding an impact occurring in a vehicle from an observed signal by a sensor installed in the vehicle.

Solution to Problem

In order to solve the foregoing problem, according to an aspect of the present invention, an impact analysis method includes: an acquisition step of acquiring an observed signal with a sensor which is an oscillation sensor or a sound sensor installed at a predetermined position of a vehicle; and an analysis step of outputting a result obtained by analyzing a time at which an impact occurs and a type of impact from the observed signal with respect to the impact occurring on the vehicle at a position different from a position at which the sensor is installed in the vehicle. The type of impact includes at least one type of impact among impact from collision of an obstacle with the vehicle, impact from the vehicle driving over a curb, impact from collision of a flying object with the vehicle, impact from the vehicle rubbing against an object other than the vehicle, and impact from an object other than the vehicle rubbing against the vehicle.

According to another aspect of the present invention, a feature amount extraction method includes: an acquisition step of acquiring univariate time-series data; a generation step of generating a data matrix by acquiring a predetermined number of pieces of partial time-series data with a predetermined length while shifting from the univariate time-series data by a predetermined shift width; and an extraction step of extracting at least a feature amount corresponding to an attenuation degree and a feature amount corresponding to an oscillation degree by performing dynamic mode decomposition of the data matrix.

Advantageous Effects of Invention

According to the impact analysis technology of the present invention, information regarding an impact occurring in a vehicle can be analyzed from an observed signal of a sensor installed in the vehicle.

BRIEF DESCRIPTION OF DRAWINGS

FIG. 10 is a diagram illustrating types of impacts and features of signal patterns.
FIG. 11 is a diagram illustrating types of impacts and features of signal patterns.

DESCRIPTION OF EMBODIMENTS

Figure 1:
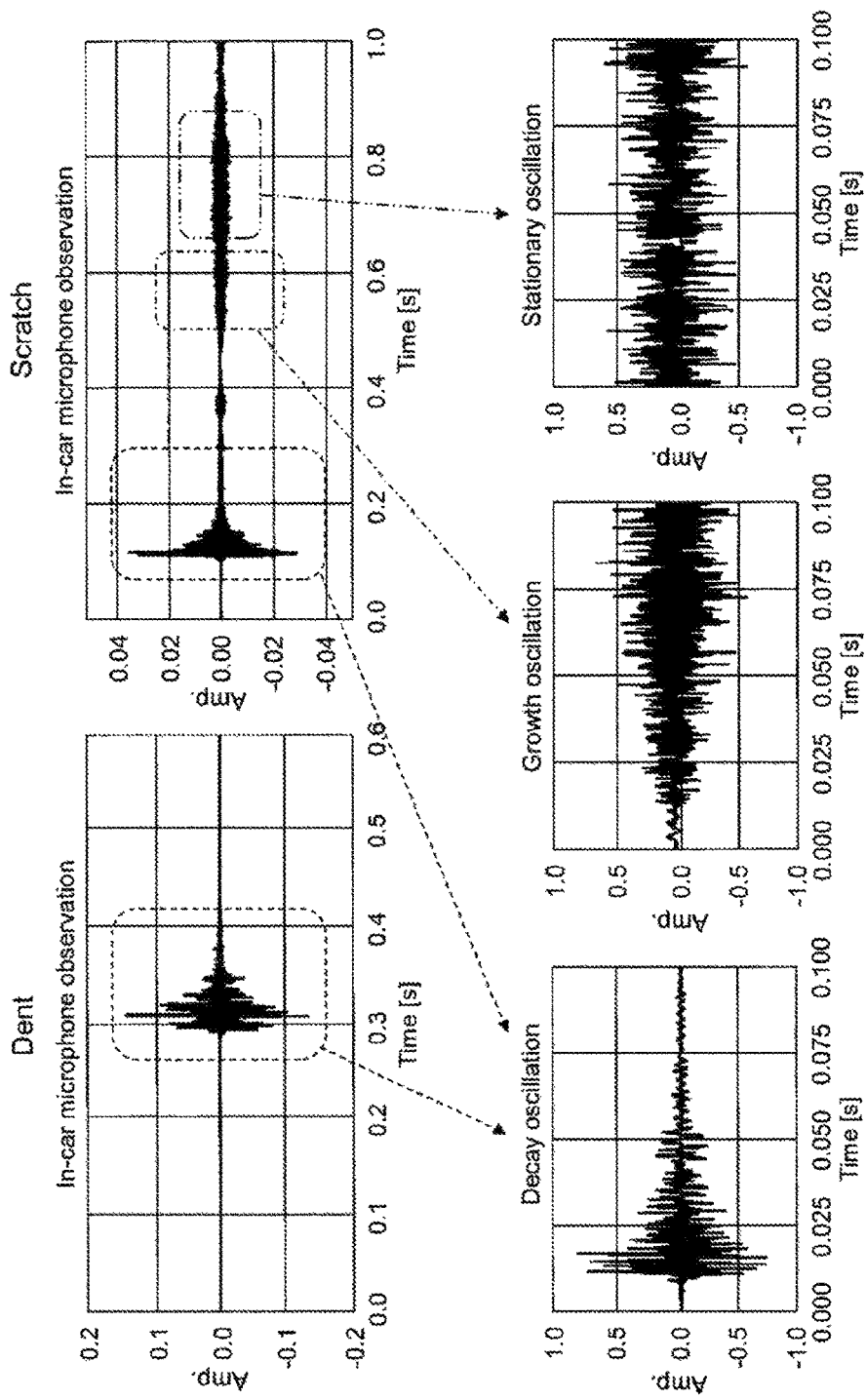
FIG. 1 is a diagram illustrating features of an observed signal at the time of occurrence of an impact.

Hereinafter, embodiments of the present invention will be described in detail. The same reference numbers are given to constituent units that have the same functions in the drawings and repeated description thereof will be omitted.

<Principle of the Present Invention>

An objective of the present invention is to analyze a time at which damage occurs in a vehicle impact occurs (a time at which an impact occurs) and which impact occurs (a type of impact) by using an observed signal acquired by a sensor such as an oscillation sensor or a sound sensor (a microphone) installed in the vehicle. The sensor is installed at any position inside or outside of the vehicle. Preferably, the sensor may be installed at a position at which a signal-to-noise ratio between a signal and noise occurring due to an assumed impact is high. For example, it is preferable to fix the sensor at a position in contact with a vehicle body structure rather than hanging the sensor in the midair inside the vehicle body. When a microphone is already installed for another purpose (for example, a voice manipulation of a car navigation system or a car phone), the microphone may be used as the sensor.

FIG. 1 illustrates an example of a vehicle body propagation sound recorded by an in-car microphone when an impact occurs in an automobile due to a collision (Dent) and friction (Scratch). When the observed signal is observed, it can be understood that features of time changes such as decay oscillation, growth oscillation, and stationary oscillation are shown. When such features can be extracted from the observed signal, it is possible to analyze information regarding an impact such as a time at which an impact occurs or a type of impact.

As a conventional technique of the related art for analyzing an observed signal, there is wavelet transform. Wavelet transform is a scheme of expressing an observed signal as a sum of a base (mother wavelet) that has a certain arbitrary waveform pattern and a base obtained by time expansion and translation of the mother wavelet. In wavelet transform, however, only parameters related to the time expansion (a frequency and time translation) are obtained, and features related to attenuation or divergence (time development) may depend on a scheme of selecting the base.

As another technology of the related art for analyzing an observed signal, there is empirical mode decomposition. The empirical mode decomposition is a scheme of decomposing an observed signal into a sum of an intrinsic mode function (IMF) and a residue. The intrinsic mode function is a function satisfying the following two conditions. The first condition is that a difference between the number of extreme values of the signal and the number of zero-crossings of a signal is 0 or 1. The second condition is that an average value of envelopes formed from maximum points and minimum points at arbitrary points of the signal is zero. The empirical mode decomposition is particularly used to analyze a non-stationary signal. In the empirical mode decomposition, it is possible to extract a base that indicates the features from the observed signal. However, since physical meanings and interpretation are not associated with the extracted unique mode, it is necessary to manually give interpretation.

In the present invention, it is conceivable to analyze an observed signal using dynamic mode decomposition widely used for analyzing multivariate time-series data. The observed signal which is a target in the present invention is univariate time-series data which is a single observation point at a single time. Therefore, in order to analyze this observed signal by dynamic mode decomposition, it is necessary to generate a data matrix. At this time, in the present invention, a scheme in which the data matrix is generated by extracting a predetermined number of pieces of partial time-series data at a shift width of 1 (while shifting the data sample by sample) is applied. According to this scheme, a relation of a recurrence formula can be found in a dynamic mode obtained by decomposition and a mathematical expression of the decomposition can be simplified. As a result, the finally obtained feature amount can have a physical meaning. By using the present invention, the observed signal can be decomposed into bases that have parameters of exponential attenuation or increase and oscillation, and a feature amount corresponding to the degree of attenuation and a feature amount corresponding to the degree of oscillation can be obtained.

<Dynamic Mode Decomposition of Univariate Time-Series Data>

Hereinafter, a processing procedure of dynamic mode decomposition for the univariate time-series data will be described. The details of the dynamic mode decomposition are described in the following Reference Document 1.

[Reference Document 1] Jonathan H. Tu, Clarence W. Rowley, Dirk M. Luchtenburg, Steven L. Brunton, and J. Nathan Kutz, "On dynamic mode Decomposition: Theory and Applications," Journal of Computational Dynamics, vol. 1, No. 2, pp. 391 to 421, December 2014.

In the following description, a lower case letter x with a suffix in parentheses as in x(n) represents an observation value of a time represented by the suffix. A lower case letter x with a subscript suffix as in $x_n$ represents a vector of an observation value in which a time represented by the suffix is a head. A capital letter X with a subscript suffix as in $X_n$ represents a data matrix in which a time represented by the suffix is a head. An underscore in a subscript represents that the character immediately after it is added as a subscript to the character immediately before it. That is, $X_{n1}$ represents n1 that is attached to x.

Figure 2:
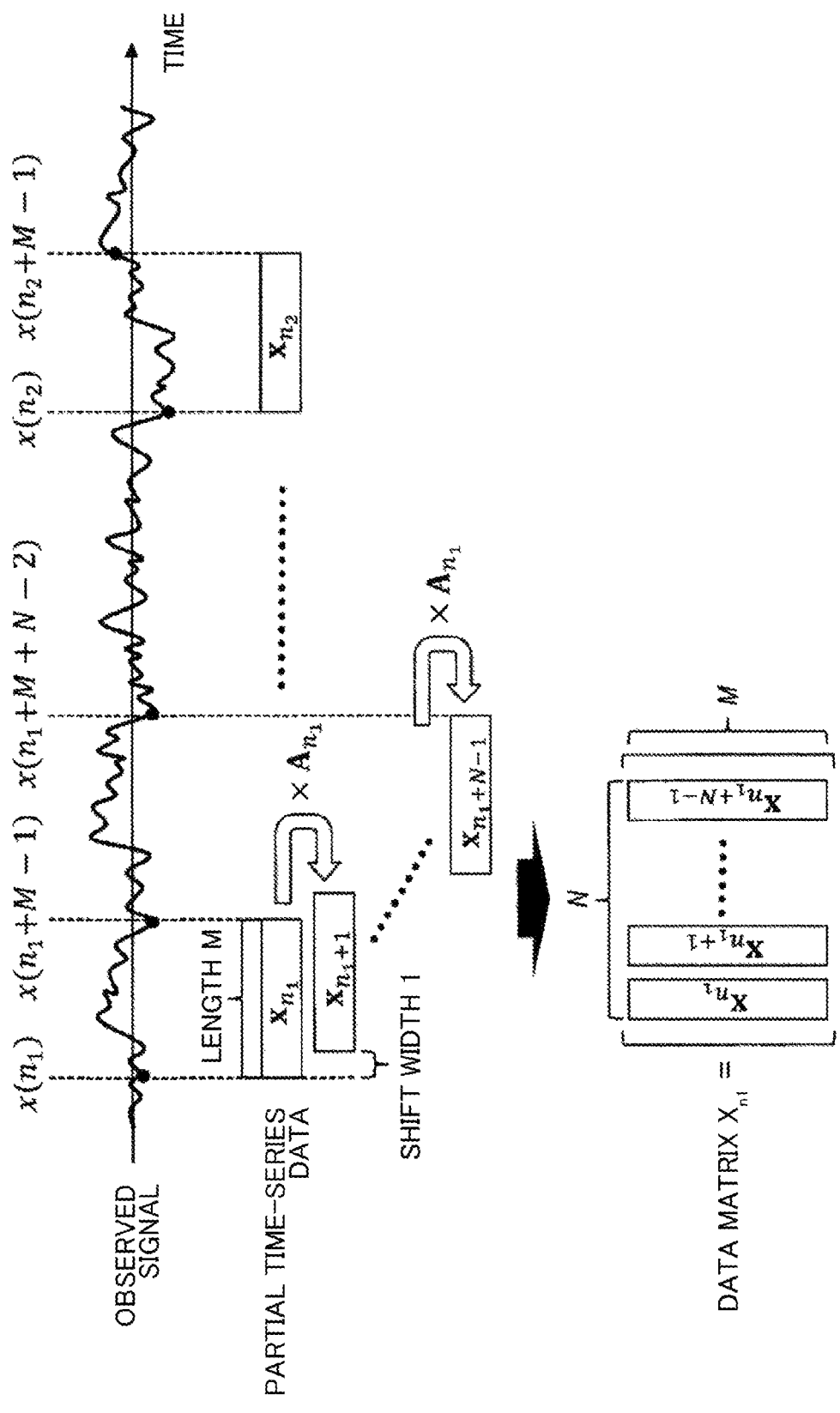
FIG. 2 is a diagram illustrating a method of generating a data matrix.

First, a data matrix which is a target of dynamic mode decomposition is generated from univariate time-series data. As illustrated in FIG. 2, an N×M data matrix is generated by acquiring N pieces of partial time-series data of M samples from an observed signal and arranging the partial time-series data. M and N are integers equal to or greater than 2. The N pieces of partial time-series data are obtained N times while shifting one sample by sample. That is, an observation value $x(n_1)$ at time $n_1$ to an observation value $x(n_1+M-1)$ at time $n_1+M-1$ are acquired as partial time-series data $x_{n\_1}$, an observation value $x(n_1+1)$ at time $n_1+1$ to an observation value $x(n_1+M)$ at time $n_1+M$ are acquired as partial time-series data $x_{n\_2}$, ..., and an observation value $x(n_1+N-1)$ at time $n_1+N-1$ to an observation value $x(n_1+N+M-2)$ at time $n_1+N+M-2$ are acquired as partial time-series data $x_{n\_1+N-1}$, so that N partial time-series data $x_{n\_1}$, $x_{n\_1+1}$, ..., $x_{n\_1+N-1}$ is acquired. By arranging the partial time-series data $x_{n\_1}$, $x_{n\_1+1}$, ..., $x_{n\_1+N-1}$, N×M data matrixes $X_{n\_1}=[x_{n\_1}, x_{n\_1+1}, \ldots, x_{n\_1+N-1}]$ are generated.

Temporal behaviors of a data matrix $x_{n\_1}=[x_{n\_1}, x_{n\_1+1}, \ldots, x_{n\_1+N-1}]$ at a time $n_1$ and a data matrix $x_{n\_1+1}=[x_{n\_1+1}, x_{n\_1+2}, \ldots, x_{n\_1+N}]$ at a time $n_1+1$ can be expressed by the matrix Ani as follows.

$$X_{n_1+1}=A_{n_1}X_{n_1} \qquad [\text{Math. 1}]$$

Subsequently, the matrix $A_{n\_1}$ is obtained from actual observation values by the following expression. In addition, a superscript + ($\cdot^+$) represents a pseudo inverse matrix.

$$A_{n_1} \cong X_{n_1+1} X_{n_1}^+ \qquad \text{[Math. 2]}$$

Subsequently, the matrix $A_{n\_1}$ is subjected to eigendecomposition by the following expression. Here, R is the number of modes, $\varphi_1, \ldots, \varphi_R$ are M-dimensional vectors corresponding to dynamic modes, and diag is a diagonal matrix.

$$A_{n_1} = \Phi_{n_1} \Lambda_{n_1} \Phi_{n_1}^{-1} \qquad \text{[Math. 3]}$$

$$\Phi_{n_1} = \begin{bmatrix} | & \cdots & | \\ \phi_1 & \cdots & \phi_R \\ | & \cdots & | \end{bmatrix} \in \mathbb{C}^{M \times R}$$

$$\Lambda_{n_1} = \mathrm{diag}(\lambda_1, \ldots, \lambda_R) \in \mathbb{C}^{R \times R}$$

The partial time-series data $x_{n\_2}$ at time $n_2$ can be predicted as in the following expression using the partial time-series data $x_{n\_1}$ at a time $n_1$.

$$x_{n_2} = A_{n_1} x_{n_2-1} = \ldots = A_{n_1}^{N_2-n_1} x_{n_1} \qquad \text{[Math. 4]}$$

The partial time-series data $x_{n\_2}$ can be expressed as in the following expression when the matrices $\Phi_{n\_1}$ and $\Lambda_{n\_1}$ obtained by the eigendecomposition are used.

$$X_{n_2} = \Phi_{n_1} \Lambda_{n_1}^{n_2-n_1} \Phi_{n_1}^{-1} x_{n_1} \qquad \text{[Math. 5]}$$
$$= \Phi_{n_1} \Lambda_{n_1}^{n_2-n_1} b_{n_1}$$

In the dynamic mode decomposition of the above-described univariate time-series data, a shift width between pieces of partial time-series data is set to one sample. Thus, as will be described below, an m-th element and an m−1-th element of adjacent partial time-series data have the same value.

Partial time-series data $x_n = \Phi \Lambda^n b_0$ at a time n can be expressed as in the following expression.

$$\begin{bmatrix} x(n) \\ x(n+1) \\ \vdots \\ x(n+m) \\ \vdots \\ x(n+M-1) \end{bmatrix} = \begin{bmatrix} \phi_{0,1} & \cdots & \phi_{0,R} \\ \phi_{1,1} & \cdots & \phi_{1,R} \\ \vdots & \ddots & \vdots \\ \phi_{m,1} & \cdots & \phi_{m,R} \\ \vdots & \ddots & \vdots \\ \phi_{M-1,1} & \cdots & \phi_{M-1,R} \end{bmatrix} \begin{bmatrix} \lambda_1^n & & \\ & \ddots & \\ & & \lambda_R^n \end{bmatrix} \begin{bmatrix} b_1 \\ \vdots \\ b_R \end{bmatrix} \qquad \text{[Math. 6]}$$

Then, an m-th element $x(n+m)$ of the partial time-series data x: becomes the following expression.

$$x(n+m) = \sum_{r=1}^{R} \phi_{m,r} \lambda_r^n b_r \qquad \text{[Math. 7]}$$

On the other hand, partial time-series data $x_{n+1} = \Phi \Lambda^{n+1} b_0$ at a time n+1 can be expressed as in the following expression.

$$\begin{bmatrix} x(n+1) \\ x(n+2) \\ \vdots \\ x(n+m) \\ x(n+m+1) \\ \vdots \\ x(n+M) \end{bmatrix} = \begin{bmatrix} x((n+1)+1) \\ \vdots \\ x((n+1)+(m-1)) \\ x((n+1)+m) \\ \vdots \\ x((n+1)+M-1) \end{bmatrix} = \qquad \text{[Math. 8]}$$

$$\begin{bmatrix} \phi_{0,1} & \cdots & \phi_{0,R} \\ \phi_{1,1} & \cdots & \phi_{1,R} \\ \vdots & \ddots & \vdots \\ \phi_{m-1,1} & \cdots & \phi_{m-1,R} \\ \phi_{m,1} & \cdots & \phi_{m,R} \\ \vdots & \ddots & \vdots \\ \phi_{M-1,1} & \cdots & \phi_{M-1,R} \end{bmatrix} \begin{bmatrix} \lambda_1^{n+1} & & \\ & \ddots & \\ & & \lambda_R^{n+1} \end{bmatrix} \begin{bmatrix} b_1 \\ \vdots \\ b_R \end{bmatrix}$$

Then, an (m−1)-th element $x((n+1)+(m-1))$ of the partial time-series data $x_{n+1}$ indicates the following expression.

$$x((n+1)+(m-1)) = \sum_{r=1}^{R} \phi_{m-1,r} \lambda_r^{n+1} b_r \qquad \text{[Math. 9]}$$

$$x(n+m) = \sum_{r=1}^{R} (\phi_{m-1,r} \lambda_r) \lambda_r^n b_r$$

From the above description, it can be understood that the dynamic mode has a relation of a recurrence formula as in the following expression.

$$\phi_{m,r} = \lambda_r \phi_{m-1,r} = \ldots = \lambda_r^m \phi_{0,r} \qquad \text{[Math. 10]}$$

When the relationship of the recurrence formula is used, an observed signal $x(n+m)$ at a time n+m can be expressed as in the following expression.

$$x(n+m) = \sum_{r=1}^{R} \lambda_r^{n+m} \phi_{0,r} b_r \qquad \text{[Math. 11]}$$

$$= \sum_{r=1}^{R} \lambda_r^{n+m} c_r$$

Accordingly, an observed signal $x(n)$ at a time n indicates the following expression. This is a representation of a discrete time signal of the observed signal $x(n)$.

$$x(n) = \sum_{r=1}^{R} \lambda_r^n c_r \qquad \text{[Math. 12]}$$

Subsequently, the representation $x(n)$ of the discrete time signal is converted into a representation $x(t)$ of a continuous time signal. At this time, $n = f_s t$ ($f_s$ is a sampling frequency) is substituted. Then, the representation $x(t)$ can be developed as follows.

$$x(t) = \sum_{r=1}^{R} (|\lambda_r| \exp(i \arg(\lambda_r)))^{f_s t} c_r \qquad \text{[Math. 13]}$$

$$= \sum_{r=1}^{R} c_r |\lambda_r|^{f_s t} \exp(i \arg(\lambda_r) f_s t)$$

-continued $$= \sum_{r=1}^{R} c_r \exp\left(-\frac{t}{\tau_r}\right)(\cos(2\pi f_r t) + i\sin(2\pi f_r t))$$

Here, $\tau_r$ and $f_r$ are defined as in the following expression.

$$\tau_r = -\frac{1}{f_s \ln|\lambda_r|}$$ [Math. 14]

$$f_r = \frac{f_s \arg(\lambda)}{2\pi}$$

Figure 3:
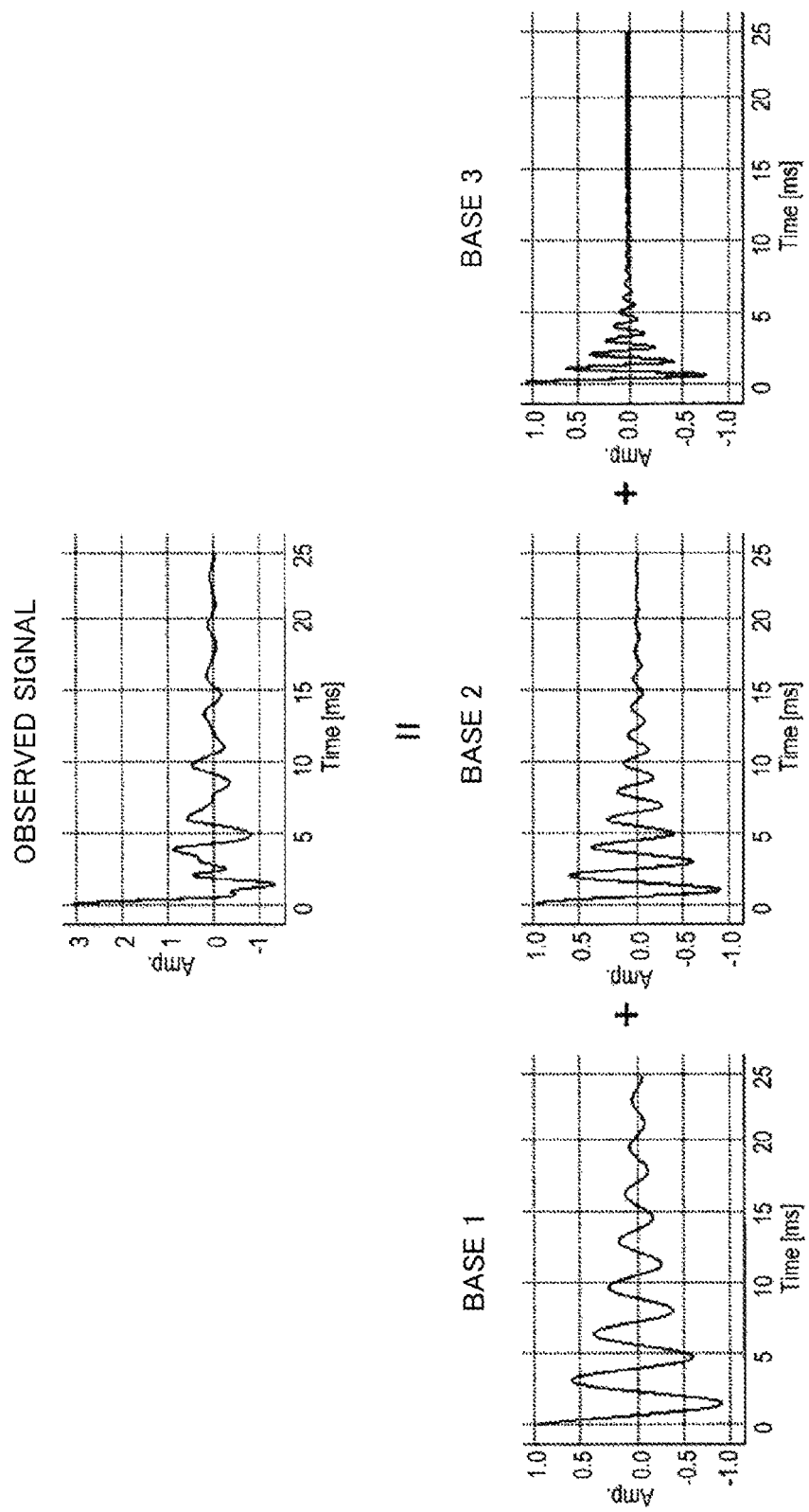
FIG. 3 is a diagram illustrating results of dynamic mode decomposition of the observed signal.
Figure 4:
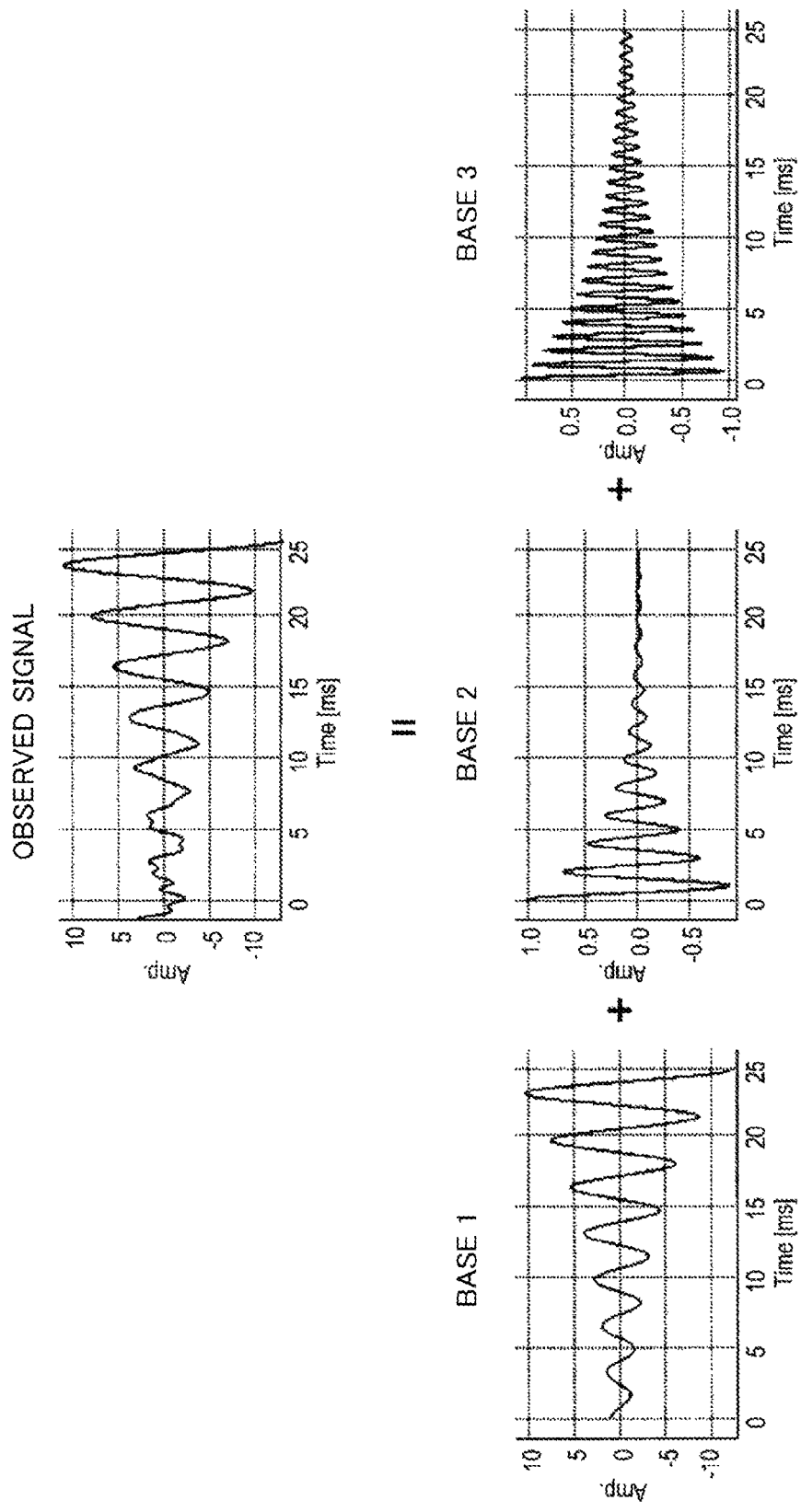
FIG. 4 is a diagram illustrating results of dynamic mode decomposition of the observed signal.

In this way, the observed signal x(n) is decomposed into R bases determined by three parameters of $c_r$, $\tau_r$, $f_r$, (where r=1, . . . , R) by dynamic mode decomposition. Here, $c_r$ corresponds to an amplitude of an r-th base, $\tau_r$ corresponds to a time constant of the r-th base, and $f_r$ corresponds to a frequency of the r-th base. FIGS. 3 and 4 illustrate examples of bases obtained by performing dynamic mode decomposition of actually obtained observed signals.

Figure 5:
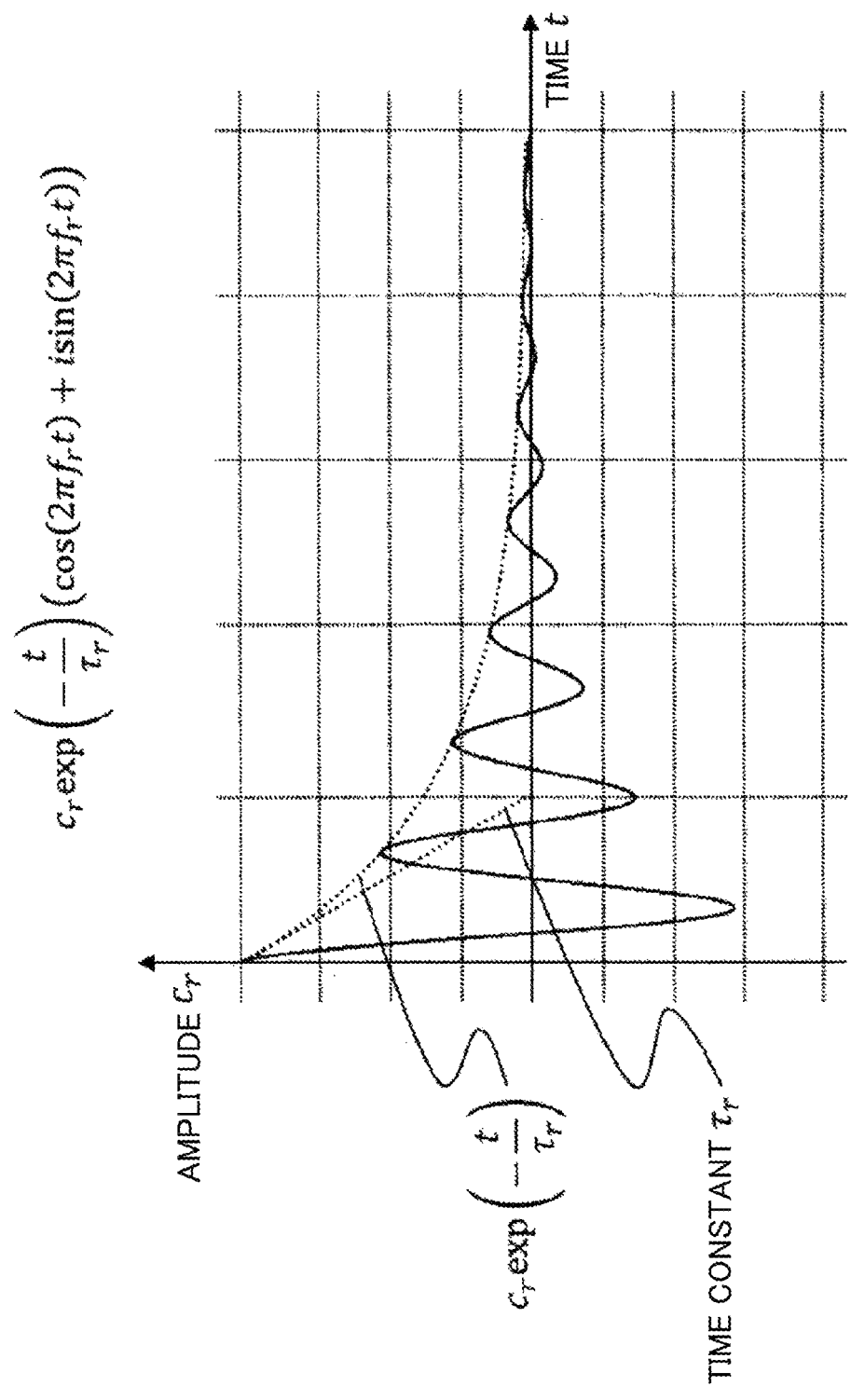
FIG. 5 is a diagram illustrating parameters of a base.

A relation between the base and the parameters obtained by the dynamic mode decomposition will be described with reference to FIG. 5. The amplitude $c_r$ represents magnitude of the amplitude. The time constant $\tau_r$ represents a rate of attenuation or increase. The frequency $f_r$ represents a rate of oscillation. That is, by applying dynamic mode decomposition to the univariate time-series data, it is possible to obtain a feature amount (the time constant $\tau_r$) corresponding to the degree of attenuation and a feature amount (the frequency $f_r$) corresponding to the degree of oscillation.

<Visualizing Feature Amount>

Figure 6:
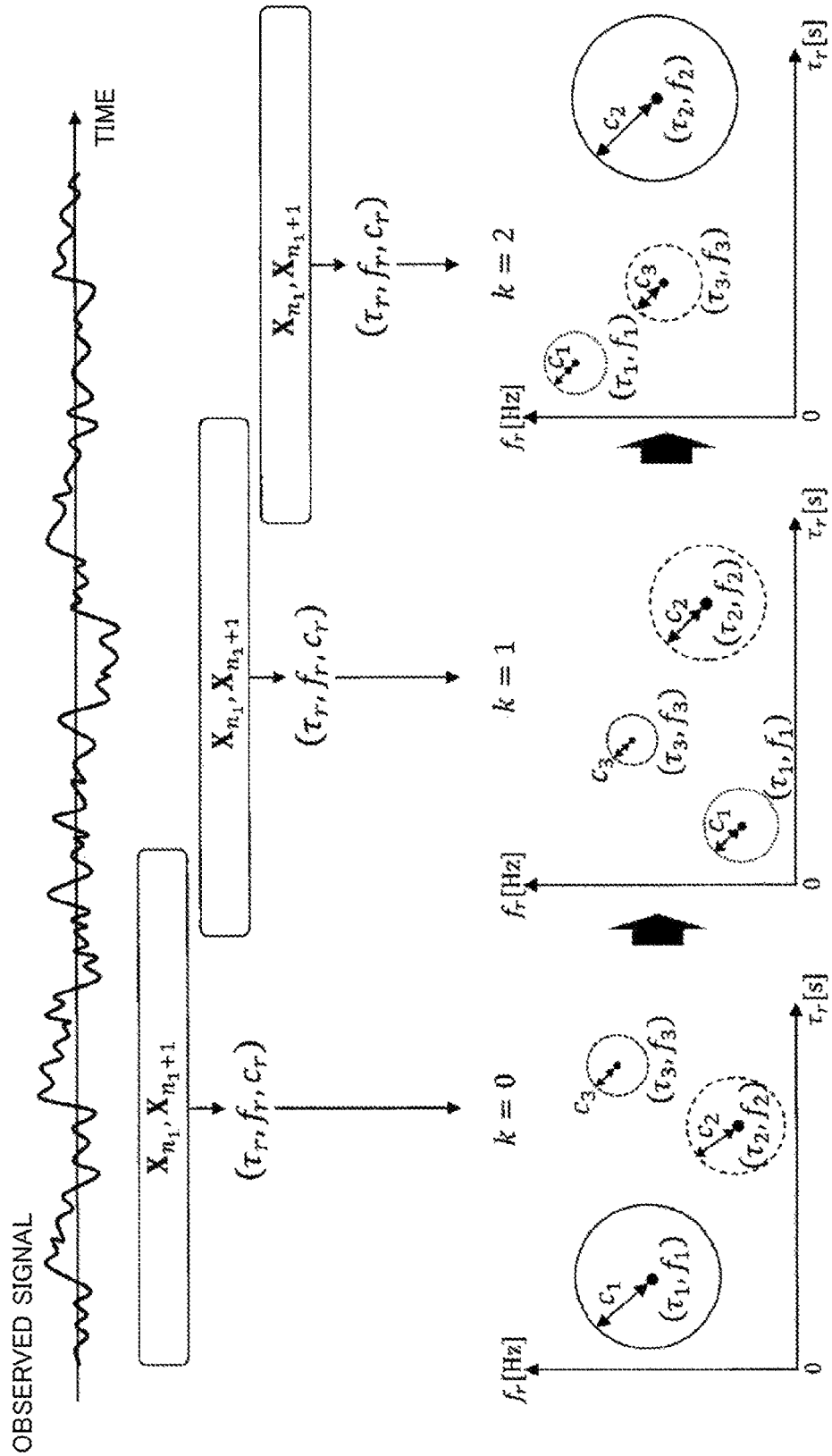
FIG. 6 is a diagram illustrating a scheme of visualizing feature amounts.

As described above, when the dynamic mode decomposition is applied to the data matrix generated from the univariate time-series data, a set of the time constant, the frequency and amplitude corresponding to the number of modes can be obtained. As illustrated in FIG. 6, a scatter diagram can be drawn by plotting the parameters in a circle with a radius corresponding to the amplitude on a time constant frequency plane. In FIG. 6, a scatter diagram is drawn by changing types of lines (a straight line, a dotted line, a broken line) in a range of the amplitude value. By drawing a scatter diagram corresponding to each time while shifting the data matrix over time and combining them in a temporal order, it is possible to visualize an aspect in which the feature amount changes like animation over time.

Figure 7:
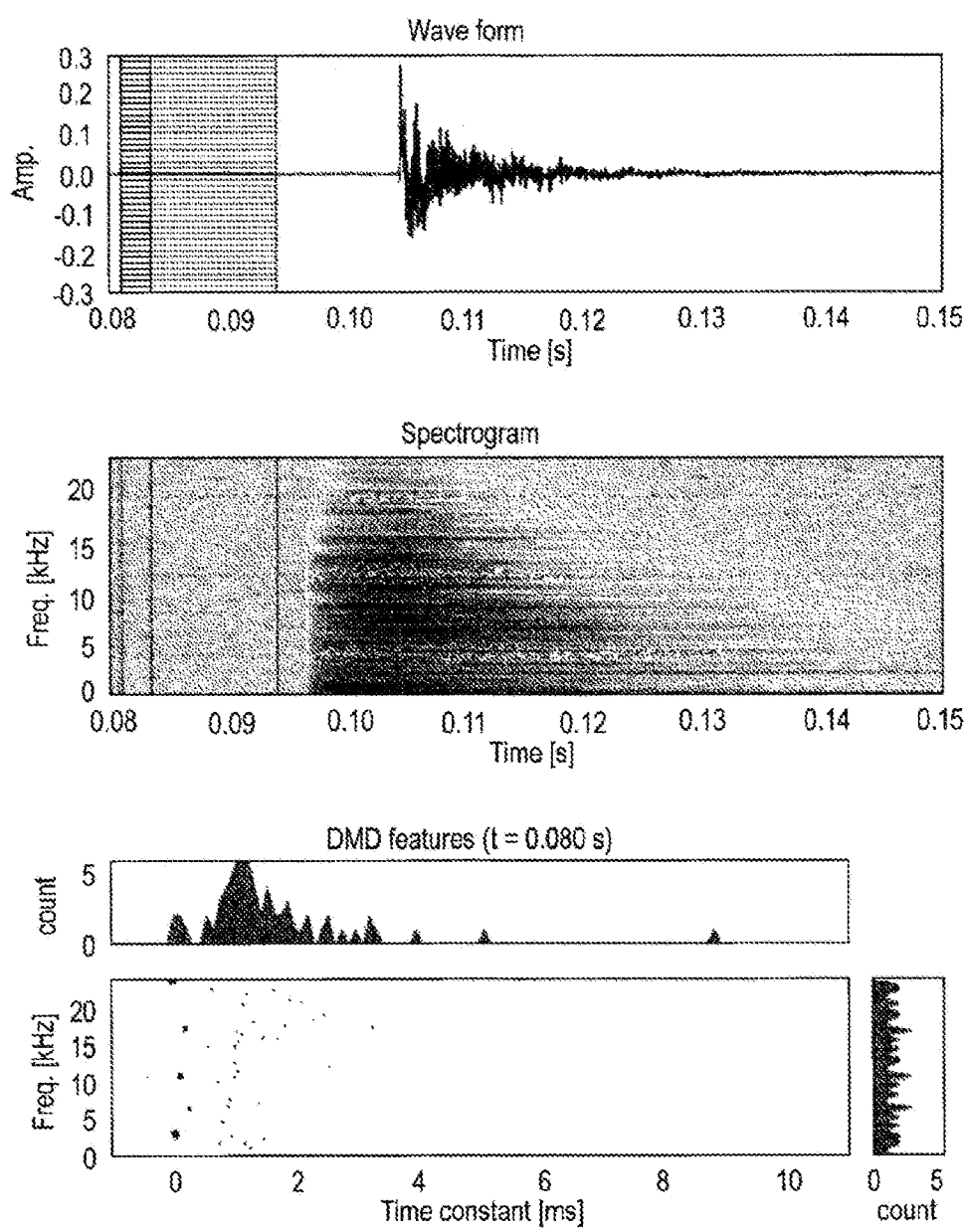
FIG. 7 is a diagram illustrating an exemplary relation between an observed signal and a feature amount.
Figure 8:
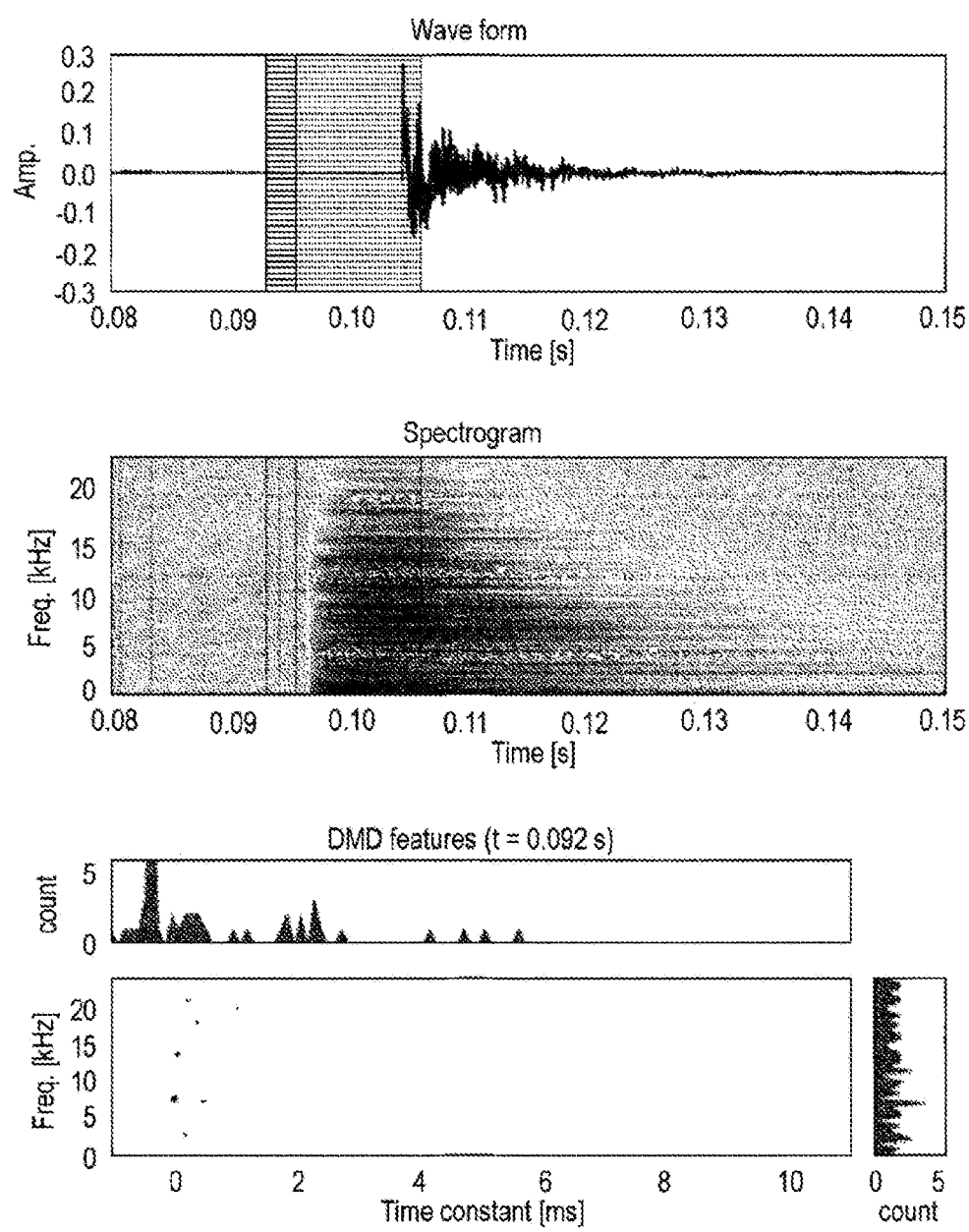
FIG. 8 is a diagram illustrating an exemplary relation between an observed signal and a feature amount.
Figure 9:
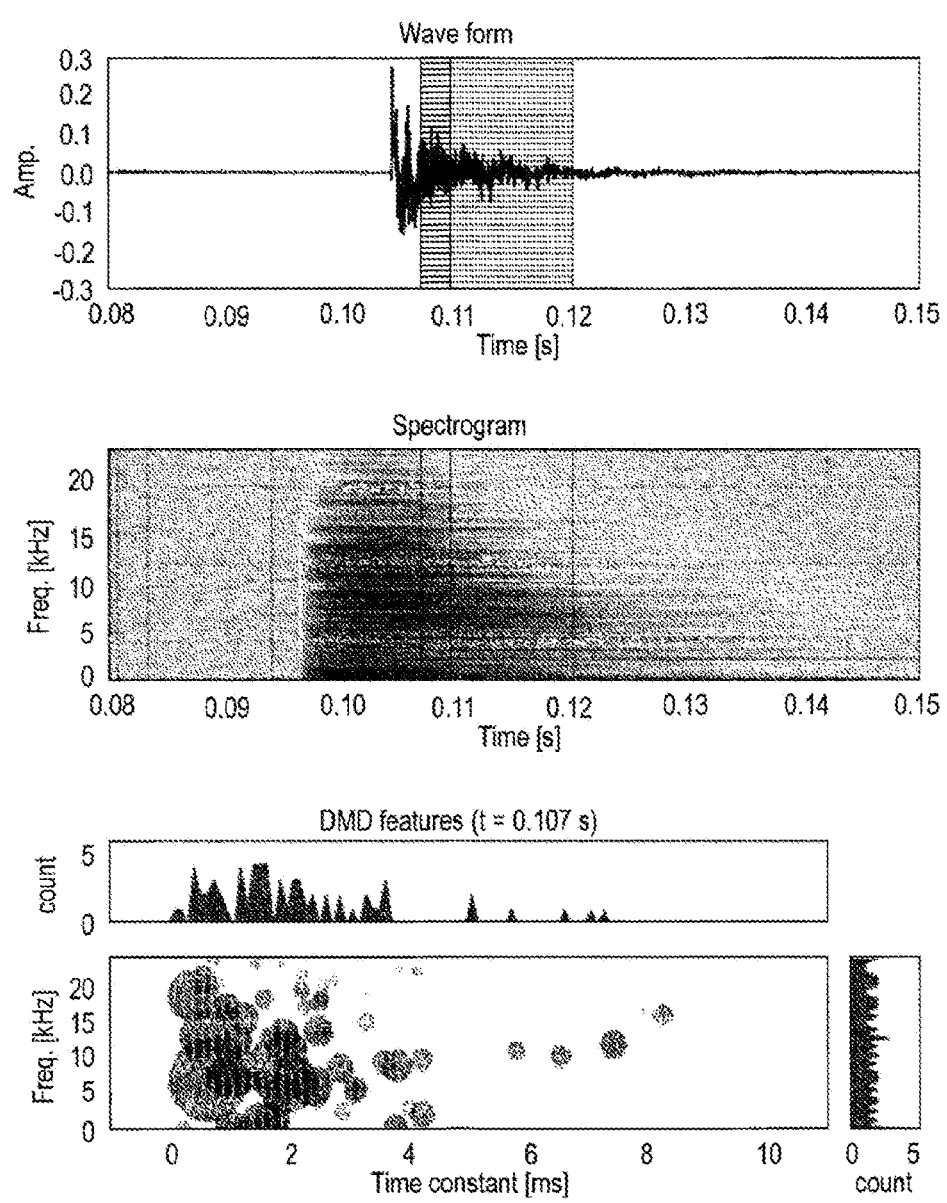
FIG. 9 is a diagram illustrating an exemplary relation between an observed signal and a feature amount.

FIGS. 7 to 9 are diagrams in which a waveform and a spectrogram of an observed signal, and a graph in which a feature amount (DMD features) acquired from the observed signal in the foregoing method is visualized in the foregoing method are caused to correspond to each other. FIG. 7 corresponds to a time point of 0.0080 seconds of the observed signal, FIG. 8 corresponds to a time point of 0.0092 seconds of the observed signal, and FIG. 9 corresponds to a time point of 0.0107 seconds of the observed signal. The observed signal used here is an acoustic signal when a metal plate lifted by a hand is struck with a metal rod. A sampling frequency is 48 kHz, a length M of the partial time-series data is 128 pt (2.67 ms), the number N of pieces of partial time-series data is 512 pt (10.7 ms), and a width (corresponding to a time interval of the data matrix corresponding to the scatter diagram) at which the data matrix is shifted over time is 16 pt (0.33 ms). Here, pt is a point, and is synonymous with a sample. From FIGS. 7 to 9, it can be seen that a negative time constant component is generated when an initial value of an impulse is included in a section of the data matrix, and a time constant component different from a silent section increases as more impulse sections are included.

<Analysis of Information Regarding Impact>

By analyzing a feature amount obtained by the dynamic mode decomposition, it is possible to identify a type of impact included in an observed signal. FIGS. 10 and 11 illustrate types of assumed impacts and the features of a signal pattern observed with each impact.

FIG. 10 is a table illustrating types of impacts caused due to certain collisions. A collision means that a vehicle collides with another object (or another object collides with a vehicle). As collisions, there are a case of a collision of a moving vehicle with a fixed object, a case of collision of a moving object with a stopped vehicle, and a case of collision of a moving vehicle and a moving object. For example, when an automobile collides with an obstacle such as a pylon or a piece of concrete, an observed signal has features of an exponential attenuation and a periodic oscillation and, in particular, the attenuation rate is slow and the impact occurs once. For example, when an automobile rides over a curb formed by a metal or wooden square bar, an observed signal has features of exponential attenuation and periodic oscillation and, in particular, an attenuation rate is low and the impact occurs twice on the front and rear wheels. For example, when a flying object such as a ball thrown by a person collides with an automobile, an observed signal has features of exponential attenuation and periodic oscillation and, in particular, an attenuation rate is high, and the same impact is repeated after bouncing off the vehicle body.

FIG. 11 is a table showing types of impacts caused due to certain friction. Friction means that a vehicle rubs against another object (or another object rubs against a vehicle), that is, moves while in contact with the other object. As friction, there are a case of friction of a vehicle with a fixed object while in contact with the object, a case of friction of an object with a stopped vehicle while in contact with the vehicle, and a case of friction between a vehicle and an object moving while they are in contact with each other. For example, when an automobile rubs against an obstacle such as a piece of concrete, an observed signal has features of an exponential increase and periodic oscillation (or steady oscillation) and, in particular, there is a specific frequency component. For example, when a person rubs a certain object (for example, a metal object such as a coin or a key or an organic substance such as a fingernail) on an automobile and makes a scratch, the observed signal has features of exponential increase and periodic oscillation (or steady oscillation) and, in particular, a main frequency changes over time.

As an identification scheme, any scheme used generally for tasks of known class classification, such as a scheme based on threshold processing and machine learning, may be used. For example, a feature amount is extracted from the observed signal corresponding to each type of impact collected in advance, and a time constant and a range of the frequency corresponding to each type of the impact are determined. A type of impact is identified by determining to which range the input feature amount belongs. For example, feature amounts are extracted from observed signals corresponding to various types of impacts collected in advance and the feature amounts cluster. Then, the type of impact is identified based on the distance between the input feature amount and the center of gravity of each cluster. That is, when a distance between the input feature amount and the center of gravity of a certain cluster is equal to or less than a predetermined threshold, it is determined that the type of impact corresponds to the cluster. In the scheme, it is considered that impacts are identified as a plurality of types, but a likelihood of each type of impact (for example, a distance from the center of gravity of the cluster or a normalized value of the cluster) may be added and output or only a type of impact with the highest likelihood (for example, corresponding to a cluster from which a distance is closest) may be output.

Embodiment

An embodiment of the present invention is an impact analysis device and method in which a feature amount is extracted by performing dynamic mode decomposition on an observed signal with a sensor installed at a predetermined position of a vehicle, and information regarding an impact (a time at which the impact occurs or a type of impact) is analyzed from the feature amount. Hereinafter, it is assumed that a vehicle is an automobile, but the vehicle which is a target of the present invention is not limited thereto. For example, the present invention can be applied to any vehicle such as a motorcycle or a train. The target of the present invention is not limited to an impact on a vehicle, and can be applied to a signal that can apply dynamic mode resolution, that is, a signal that attenuates or amplifies while propagating from a generation position to an observation position. For example, it is also possible to analyze a signal from a sensor installed on window glass, a door, or the like of a share house by assuming that a shared object installed in the share house where a plurality of people live together is damaged.

Figure 12:
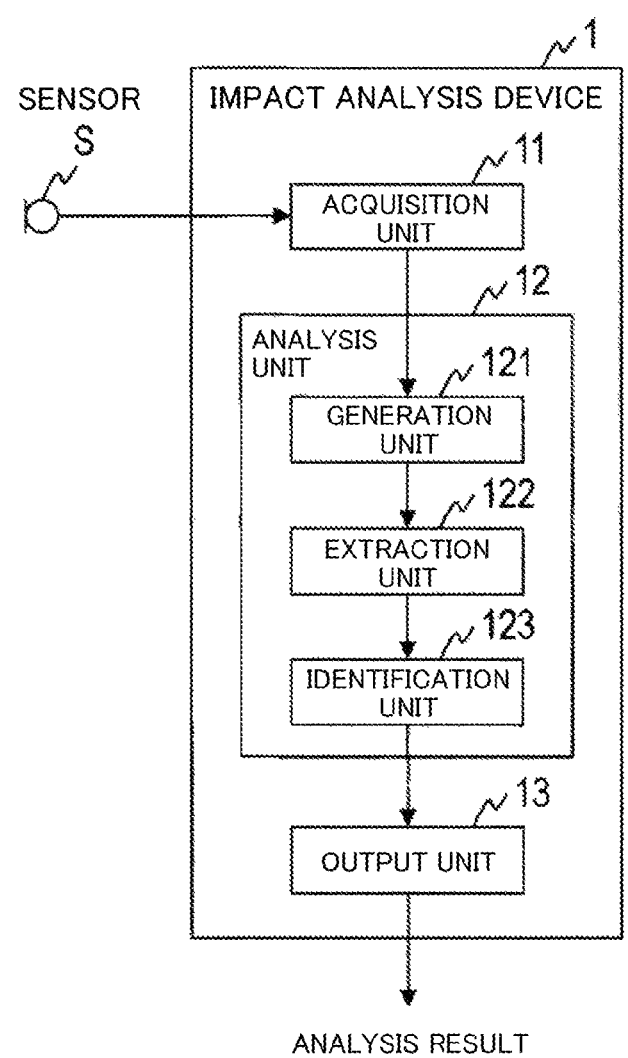
FIG. 12 is a diagram illustrating an exemplary functional configuration of an impact analysis device according to an embodiment.

As illustrated in FIG. 12, an impact analysis device 1 according to the embodiment includes, for example, an acquisition unit 11, an analysis unit 12, and an output unit 13. The analysis unit 12 includes a generation unit 121, an extraction unit 122, and an identification unit 123. The impact analysis device 1 is connected to a sensor S. The sensor S is installed at a predetermined position inside or outside of a vehicle. The sensor S may be embedded in the impact analysis device 1 or may be connected to the impact analysis device 1 via various wired or wireless interfaces. The impact analysis device 1 performs each step illustrated in FIG. 13 to realize an impact analysis method according to the embodiment The impact analysis device 1 is, for example, a special device configured by causing a known or dedicated computer that includes a central processing unit (CPU) and a main memory unit (a random access memory (RAM) to read a special program. The impact analysis device 1 performs each processing under control of the central processing unit, for example. Data input to the impact analysis device 1 and data obtained by each processing are stored in, for example, a main storage device and data stored in the main storage device is read out to the central processing unit and used in other processing as necessary. At least of some of processing units of the impact analysis device 1 may be configured by hardware such as an integrated circuit.

Figure 13:
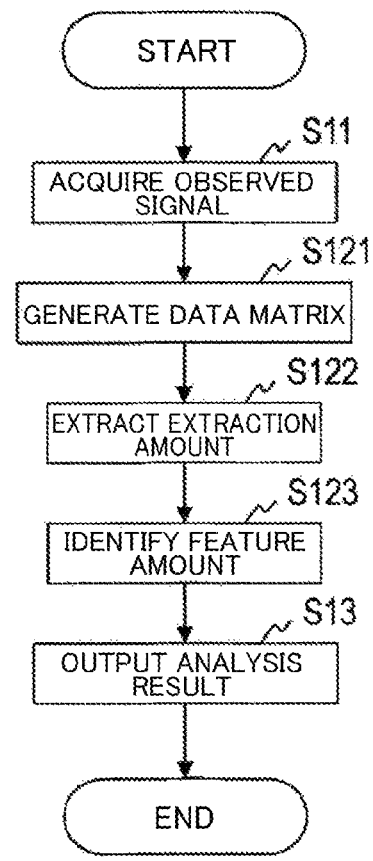
FIG. 13 is a diagram illustrating a processing procedure of an impact analysis method according to an embodiment.

Hereinafter, an impact analysis method performed by the impact analysis device 1 of the embodiment will be described with reference to FIG. 13.

In step S11, the acquisition unit 11 acquires an observed signal obtained with the sensor S. Since the observed signal is time-series data observed with one sensor S, the observed signal is univariate time-series data. The acquisition unit 11 outputs the acquired observed signal to the analysis unit 12. The observed signal input to the analysis unit 12 is input to the generation unit 121.

In step S121, the generation unit 121 of the analysis unit 12 generates a data matrix from the input observed signal according to the above-described method. That is, the generation unit 121 acquires a predetermined number of pieces of partial time-series data of a predetermined length while shifting the observed signal by a predetermined shift width, and arranges the partial time-series data to generate a data matrix. The generation unit 121 outputs the generated data matrix to the extraction unit 122.

In step S122, an extraction unit 122 of an analysis unit 12 extracts a feature amount from an input data matrix according to the method. That is, the extraction unit 122 obtains a feature amount corresponding to the degree of attenuation and a feature amount corresponding to the degree of oscillation by applying dynamic mode decomposition to the data matrix and decomposing the observed signal into bases determined by parameters such as an amplitude, a time constant, and a frequency. The extraction unit 122 outputs the extracted feature amounts to the identification unit 123.

In step S123, the identification unit 123 of the analysis unit 12 identifies whether or not the input feature amount corresponds to each type of predetermined impact according to the above-described method. The type of impact is related to, for example, collision and friction. Examples of the impact related to the collision include an impact of a vehicle colliding with an obstacle, an impact of a vehicle riding over a curb, and an impact of a flying object colliding with a vehicle. Examples of an impact related to friction include friction of a vehicle with an object other than a vehicle and friction of an object other than a vehicle with a vehicle. An identification result corresponds to any one type of impact in some cases and the identification result corresponds to two or more types of impacts in some cases. When it is determined that the input feature amount does not correspond to any type of impact (that is, when an impact does not occur in a time section corresponding to the feature amount), the identification unit 123 ends the processing. When it is determined that the input feature amount corresponds to any type of impact, the identification unit 123 outputs the obtained identification result to an output unit 13.

In step S13, the output unit 13 generates information indicating at least a time at which the impact occurs and the type of impact from the input identification result and uses the information as an output of the impact analysis device 1. Here, the time at which the impact occurs is an earliest time of an observation value included in the data matrix corresponding to the identified feature amount. The information output by the output unit 13 is not limited thereto, and only the time when the impact occurs may be output, only the type of impact may be output, an observed signal when the impact occurs may be output, or any combination thereof may be output.

[Modification 1]

In the foregoing embodiment, the feature amount corresponding to the degree of attenuation and the feature amount corresponding to the degree of oscillation are obtained from an observed signal acquired by a single sensor. By installing a plurality of sensors at different positions of the vehicle and extracting a feature amount from each observed signal acquired by each sensor, it is possible to estimate a position at which the impact has occurred. For example, sensors are installed in a front portion (for example, a front bumper) and a rear portion (for example, a rear bumper) of an automobile. When the same type of impact is identified at the same time from the observed signals by the sensors, it is considered that the observed signal by the sensor closer to a portion in which the impact has occurred indicates a larger amplitude.

For example, when an amplitude at a time at which the impact has occurred is greater in the sensor installed in the front portion than in the sensor installed in the rear portion, it can be estimated that the impact has occurred in the front side of the automobile. On the other hand, when an amplitude at the time at which the impact has occurred is substantially the same between the sensor installed in the front portion and the sensor installed in the rear portion, it can be estimated that the impact has occurred near the center of the automobile. When the number of sensors installed in the automobile is increased, a position at which an impact has occurred can be estimated with higher accuracy.

Figure 14:
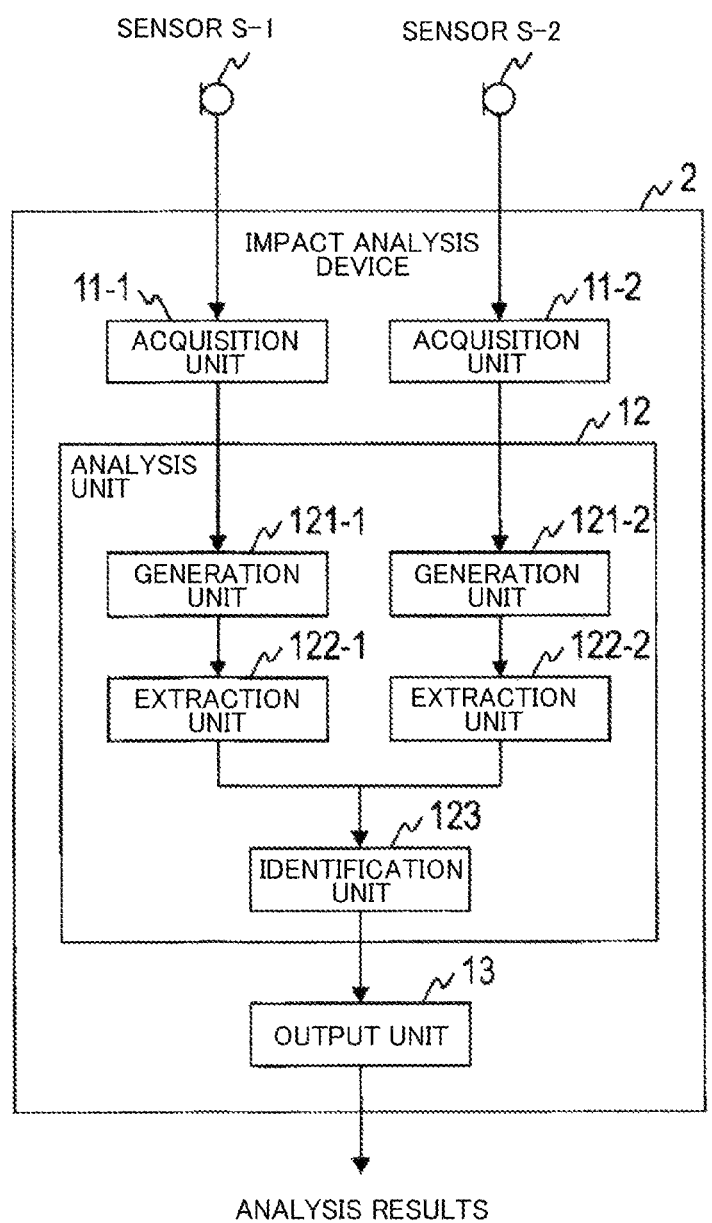
FIG. 14 is a diagram illustrating an exemplary functional configuration of an impact analysis device according to Modification 1.

As illustrated in FIG. 14, an impact analysis device 2 of Modification 1 is connected to a plurality of sensors S, and includes the same number of acquisition units 11 as the sensors S. The analysis unit 12 of Modification 1 includes the same number of generation units 121 and extracting units 122 as the sensors S. FIG. 14 illustrates an example in which the number of sensors S is two, but the number of sensors S may be three or more. The acquisition unit 11-1 of Modification 1 acquires an observed signal from the sensor S-1 and the acquisition unit 11-2 acquires an observed signal from the sensor S-2. A generation unit 121-1 of Modification 1 generates a data matrix from the observed signal acquired by the acquisition unit 11-1 and a generation unit 121-2 generates a data matrix from the observed signal acquired by the acquisition unit 11-2. An extraction unit 122-1 of Modification 1 extracts the feature amounts $\tau_r$, $f_r$, $c_r$ from the data matrix generated by the generation unit 122-1 and an extraction unit 122-2 extracts the feature amounts $\tau_r$, $f_r$, $c_r$ from the data matrix generated by the generation unit 122-2. The identification unit 123 of Modification 1 identifies a type of impact based on the time constant $\tau_r$ and the frequency $f_r$ obtained by the extraction units 122-1 and 122-2 and estimates a position at which the impact has occurred based on the amplitude $c_r$. The output unit 13 of Modification 1 outputs information indicating the position at which the impact has occurred in addition to the information output by the output unit 13 according to the embodiment

[Modification 2]

Figure 15:
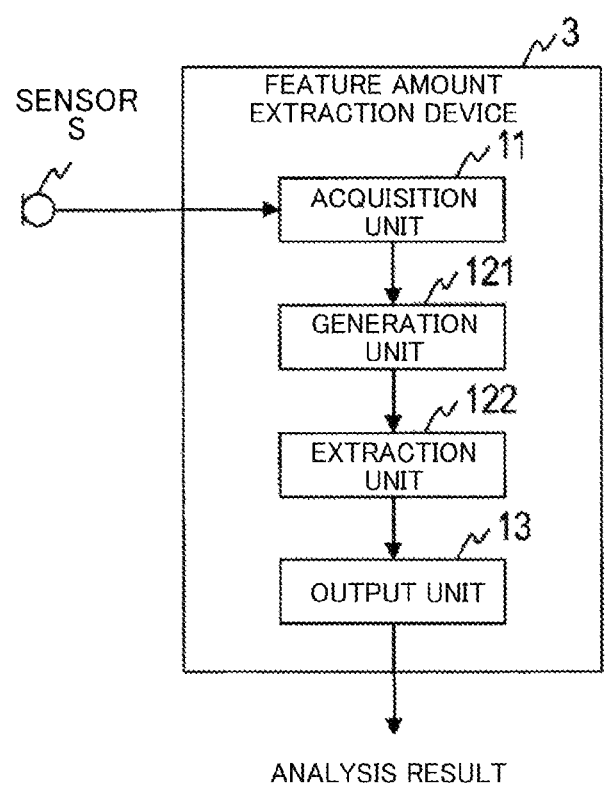
FIG. 15 is a diagram illustrating an exemplary functional configuration of a feature amount extraction device according to Modification 2.

In the above-described embodiments, the impact analysis device 1 extracts the feature amount from the observed signal with the sensor S and analyzes the information regarding the impact from the feature amount, as described above, but it is also possible to configure a feature amount extraction device that has only a function of extracting a feature amount from an observed signal. As illustrated in FIG. 15, a feature amount extraction device 3 of Modification 2 includes the acquisition unit 11, the generation unit 121, the extraction unit 122, and the output unit 13 included in the impact analysis device 1 according to the embodiment. The feature amount extraction device 3 inputs an observed signal with the sensor S and outputs a feature amount extracted from the observed signal. The acquisition unit 11 acquires the observed signal input to the feature amount extraction device 3. The generation unit 121 generates a data matrix by acquiring a predetermined number of pieces of partial time-series data with a predetermined length while shifting the observed signal by a predetermined shift width. The extraction unit 122 extracts at least the feature amount corresponding to the degree of attenuation and the feature amount corresponding to the degree of oscillation by performing dynamic mode decomposition on the data matrix. The output unit 13 uses the feature amounts extracted by the extraction unit 122 as an output of the feature amount extraction device 3.

The embodiments of the present invention have been described above, but specific configurations are not limited to the embodiments, and it goes without saying that appropriate modifications of design or the like made within a scope that does not depart from the spirit of the invention are also included in the invention. The various types of processing described in the embodiments are not limited to being executed in time series in the order described, and may be executed in parallel or individually either in accordance with the processing capability of a device that executes the processing or as necessary.

[Program and Recording Medium]

Figure 16:
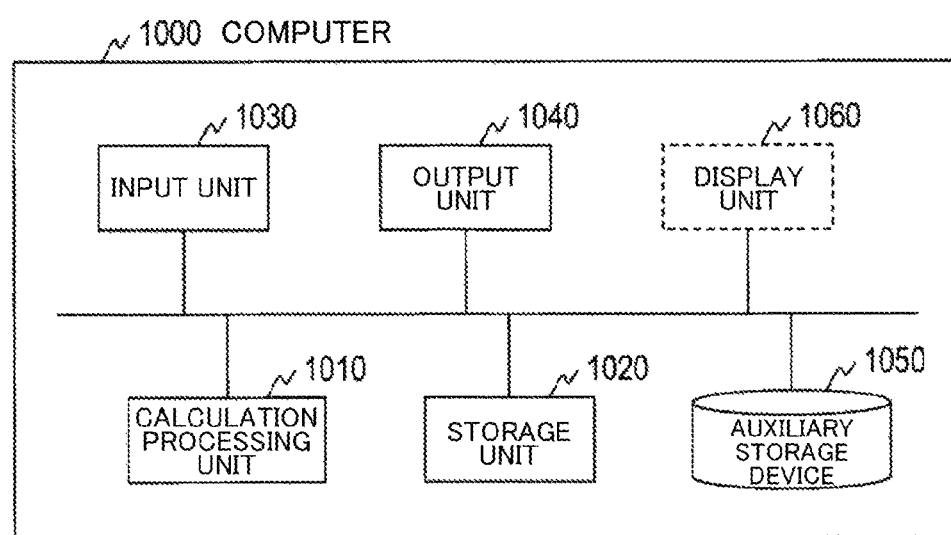
FIG. 16 is a diagram illustrating a functional configuration of a computer.

When various processing functions in each device described in the foregoing embodiments are realized by a computer, the processing details of the functions of each device are described by a program. The program is read to a storage unit 1020 of a computer illustrated in FIG. 16, and is caused to operate in a calculation processing unit 1010, an input unit 1030, an output unit 1040, and the like, and thus the various processing functions of each device described above are realized on the computer.

A program describing the processing content can be recorded on a computer-readable recording medium. A computer-readable recording medium is, for example, a non-transitory recording medium such as a magnetic recording device or an optical disc.

The program is distributed, for example, by selling, transferring, or lending a portable recording medium such as a DVD or a CD-ROM on which the program is recorded. Further, the program may be distributed by storing the program in a storage device of a server computer and transmitting the program from the server computer to other computers via a network.

For example, a computer that executes the program first stores the program recorded on a portable recording medium or the program transferred from the server computer temporarily in an auxiliary recording unit 1050 serving as a non-transitory storage device of the computer. When the computer executes the processing, the computer reads the program stored in the auxiliary recording unit 1050 serving as a non-transitory storage device of the computer to the storage unit 1020 serving as a temporary storage device and executes processing corresponding to the read program. Alternatively, according to another embodiment of the program, the computer may read the program directly from a portable recording medium and execute processing corresponding to the program, or the computer may sequentially execute processing corresponding to the program received from the server computer whenever the program is transferred from the server to the computer. Instead of transferring the program to the computer from the server computer, the above-described processing may be executed by a so-called application service provider (ASP) type service, in which a processing function is realized in accordance with only execution instructions and result acquisition. It is assumed that the program in the present mode includes information that is equivalent to a program and is to be used for processing by an electronic computer (data that is not a direct instruction to the computer but has the property of defining processing of the computer).

In this form, the device is configured by executing a predetermined program on a computer, but at least a part of the processing content may be implemented by hardware.

The invention claimed is:

1. An impact analysis method comprising:
acquiring an observed signal with a sensor installed at a predetermined position of a vehicle; and
outputting a result obtained by analyzing a time at which an impact occurs and a type of the impact from the observed signal with respect to the impact occurring on the vehicle at a position different from a position at which the sensor is installed in the vehicle,
wherein the type of impact includes at least one type of:
impact among impact from collision of an obstacle with the vehicle,
impact from the vehicle driving over a curb,
impact from collision of a flying object with the vehicle,
impact from the vehicle rubbing against an object other than the vehicle, or
impact from an object other than the vehicle rubbing against the vehicle,
the analyzing a combination of the time of the impact and the type of the impact is based on a first feature amount and a second feature amount,
the first feature amount corresponds to an attenuation degree according to univariate time-series data of the observed signal, and
the second feature amount corresponds to an oscillation degree obtained by performing dynamic mode decomposition of data according to the univariate time-series data of the observed signal.

2. The impact analysis method according to claim 1, wherein the type of impact corresponds to each cluster in which feature amounts extracted from the observed signal of the sensor acquired when the impact occurs cluster.

3. The impact analysis method according to claim 1,
wherein the sensor includes a plurality of sensors installed at different positions of the vehicle, and
wherein, in the analyzing step, a result obtained by analyzing a position at which the impact occurs based on an amplitude of an observed signal of each sensor is further output.

4. A computer-readable non-transitory recording medium storing computer-executable program instructions, that when executed by a processor causes a computer to perform each step of the impact analysis method of claim 1.

5. The computer-readable non-transitory recording medium of claim 4 wherein the type of impact corresponds to each cluster in which feature amounts extracted from the observed signal of the sensor acquired when the impact occurs cluster.

6. The computer-readable non-transitory recording medium of claim 4, wherein the sensor includes a plurality of sensors installed at different positions of the vehicle, and
wherein, in the analyzing step, a result obtained by analyzing a position at which the impact occurs based on an amplitude of an observed signal of each sensor is further output.

7. The impact analysis method according to claim 1, wherein
the sensor is an oscillation sensor.

8. The impact analysis method according to claim 1, wherein the sensor is a sound sensor.

9. The impact analysis method according to claim 2, wherein the sensor is an oscillation sensor.

10. The impact analysis method according to claim 2, wherein the sensor is a sound sensor.

11. The impact analysis method according to claim 3, wherein the plurality of sensors are oscillation sensors.

12. The impact analysis method according to claim 3, wherein the plurality of sensors are sound sensors.

13. A feature amount extraction method comprising:
an acquisition step of acquiring univariate time-series data;
a generation step of generating a data matrix by acquiring a predetermined number of pieces of partial time-series data with a predetermined length while shifting from the univariate time-series data by a predetermined shift width; and
an extraction step of extracting at least a feature amount corresponding to an attenuation degree and a feature amount corresponding to an oscillation degree by performing dynamic mode decomposition of the data matrix.

14. A computer-readable non-transitory recording medium storing computer-executable program instructions, that when executed by a processor causes a computer to perform each step of the feature amount extraction method of claim 13.

15. An impact analysis device comprising a processor configured to execute operations comprising:
acquiring an observed signal with a sensor installed at a predetermined position of a vehicle; and
outputting a result obtained by analyzing a combination of a time at which an impact occurs and a type of the impact from the observed signal with respect to the impact occurring on the vehicle at a position different from a position at which the sensor is installed in the vehicle,
wherein the type of impact includes at least one type of:
impact among impact from collision of an obstacle with the vehicle,
impact from the vehicle driving over a curb,
impact from collision of a flying object with the vehicle,
impact from the vehicle rubbing against an object other than the vehicle,
or impact from an object other than the vehicle rubbing against the vehicle,
the analyzing the combination of the time of the impact and the type of the impact is based on a first feature amount and a second feature amount,
the first feature amount corresponds to an attenuation degree according to univariate time-series data of the observed signal, and
the second feature amount corresponds to an oscillation degree obtained by performing dynamic mode decomposition of data according to the univariate time-series data of the observed signal.

16. The impact analysis device of claim 15, wherein the sensor is an oscillation sensor.

17. The impact analysis device of claim 15, wherein the sensor is a sound sensor.

* * * * *